United States Patent
Dlugoss et al.

(10) Patent No.: US 8,239,106 B2
(45) Date of Patent: Aug. 7, 2012

(54) ADAPTIVE SHIFT LEARN CONTROL FOR AUTOMATIC TRANSMISSIONS

(75) Inventors: Randall B. Dlugoss, Royal Oak, MI (US); Xiao Dong Zhang, Novi, MI (US); Tiffany N Vicks, West Bloomfield, MI (US); Xiaoping Wu, Rochester Hills, MI (US)

(73) Assignee: GM Global Technology Operations LLC

( * ) Notice: Subject to any disclaimer, the term of this patent is extended or adjusted under 35 U.S.C. 154(b) by 459 days.

(21) Appl. No.: 12/463,694

(22) Filed: May 11, 2009

(65) Prior Publication Data

US 2010/0250077 A1 Sep. 30, 2010

Related U.S. Application Data

(60) Provisional application No. 61/164,030, filed on Mar. 27, 2009.

(51) Int. Cl.
G06F 7/00 (2006.01)
G06F 17/00 (2006.01)
G06F 19/00 (2011.01)

(52) U.S. Cl. .......................................... 701/58; 701/51

(58) Field of Classification Search ............. 701/51, 701/58

See application file for complete search history.

(56) References Cited

U.S. PATENT DOCUMENTS

| 4,707,789 | A | 11/1987 | Downs et al. |
| 5,072,399 | A | 12/1991 | Laws et al. |
| 5,737,712 | A | 4/1998 | Han et al. |
| 7,356,398 | B2 | 4/2008 | Steinmetz et al. |
| 2004/0069082 | A1* | 4/2004 | Koenig et al. ................ 74/335 |
| 2004/0230360 | A1* | 11/2004 | Matsumura et al. ........... 701/51 |
| 2007/0010926 | A1* | 1/2007 | Dlugoss ......................... 701/51 |
| 2010/0274453 | A1* | 10/2010 | Dlugoss et al. ................ 701/51 |

OTHER PUBLICATIONS

U.S. Appl. No. 11/175,115, filed Jul. 5, 2005, Randall B. Dlugoss.

* cited by examiner

*Primary Examiner* — James Trammell
*Assistant Examiner* — Michael D Lang (57) ABSTRACT

A control system includes first and second clutches of a transmission and a control module. Each of the first and second clutches includes an on state and an off state. The control module cycles the first clutch between the on state and the off state using a stepped command signal while the second clutch is maintained in the on state. The control module monitors an output parameter of the transmission that is based on the stepped command signal. The control module controls the transmission based on the output parameter.

18 Claims, 6 Drawing Sheets

ADAPTIVE SHIFT LEARN CONTROL FOR AUTOMATIC TRANSMISSIONS

CROSS-REFERENCE TO RELATED APPLICATIONS

This application is related to a co-pending application, application Ser. No. 11/175,115, filed on Jul. 5, 2005, entitled "Adaptive Shift Learn Control for Automatic Transmissions," which is incorporated herein by reference in its entirety.

This application claims the benefit of U.S. Provisional Application No. 61/164,030, filed on Mar. 27, 2009. The disclosure of the above application is incorporated herein by reference in its entirety.

FIELD

The present disclosure relates to vehicle transmissions, and more particularly to a transmission control system for updating an adaptive shift control in a transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a fuel and air mixture within cylinders driving pistons to produce drive torque. The engine drives a transmission through a coupling device. Coupling devices for automatic transmissions include a torque converter. The transmission transfers the drive torque to a driveline through one of a plurality of gear ratios. The transmission shifts between gear ratios based on a shift schedule and vehicle operating conditions.

The transmission typically includes a plurality of clutches that are selectively engaged to establish a desired gear ratio. When shifting between gear ratios, clutch-to-clutch shifts occur. More specifically, at least one clutch is disengaged (i.e., an off-going clutch) while another clutch is concurrently engaged (i.e., an on-coming clutch). Control of the clutch-to-clutch shift is based on an estimated engine torque and other shift parameters including, but not limited to, an on-coming pressure offset, an off-going pressure offset, and a pressure hysteresis.

After initial assembly of the vehicle and/or after service has been performed on the transmission, the shift parameters are set to initial values and are not influenced by the adaptive/learned shift control. The on-coming pressure offset, the off-going pressure offset, and the pressure hysteresis for each clutch are adaptively learned and updated during vehicle operation. The estimated engine torque is determined using a torque estimating calculation that is based on engine operating conditions.

SUMMARY

A control system includes first and second clutches of a transmission and a control module. Each of the first and second clutches includes an on state and an off state. The control module cycles the first clutch between the on state and the off state using a stepped command signal while the second clutch is maintained in the on state. The control module monitors an output parameter of the transmission that is based on the stepped command signal. The control module controls the transmission based on the output parameter.

A method includes providing first and second clutches of a transmission, wherein each of the first and second clutches includes an on state and an off state. The method further includes cycling the first clutch between the on state and the off state using a stepped command signal while maintaining the second clutch in the on state, monitoring an output parameter of the transmission that is based on the stepped command signal, and controlling the transmission based on the output parameter.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Adaptive shift learn control techniques of the present disclosure cycle a primary clutch of a transmission between engaged and disengaged states using a stepped pressure command. Parameters of the transmission are monitored while the primary clutch is cycled, and clutch characteristics are calculated based on the parameters. The stepped pressure command is held at a predetermined value for a predetermined period as the primary clutch engages and disengages. In this manner, commanded clutch pressures that correspond to the parameters are accurately determined. In turn, the clutch characteristics based on the commanded clutch pressures are accurate.

Adaptive shift learn control techniques of the present disclosure may also include a transmission output torque in the parameters monitored. The clutch characteristics may be calculated based on the transmission output torque. In this manner, inaccuracies in the clutch characteristics due to variations in the transmission output torque may be reduced.

Figure 1:
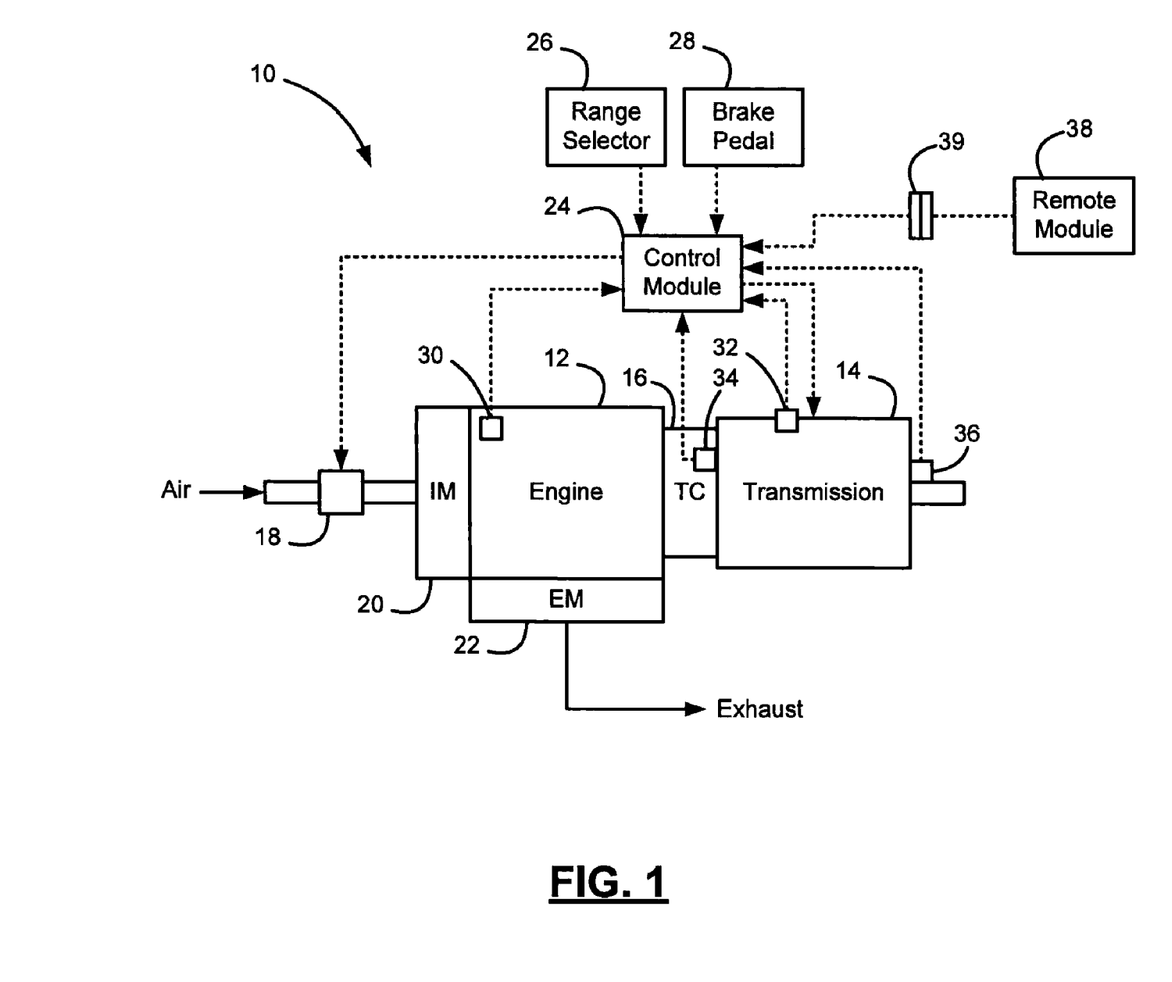
FIG. 1 is a functional block diagram of an exemplary vehicle system according to an embodiment of the present disclosure.

Referring now to FIG. 1, an exemplary vehicle system 10 is schematically illustrated. The vehicle system 10 includes an engine 12 that combusts a fuel and air mixture within cylinders (not shown) to drive pistons slidably disposed within the cylinders. The pistons drive a crankshaft (not shown) that drives a transmission 14 through a torque converter 16. Air is drawn through a throttle 18 and into an intake manifold 20 that distributes air to the individual cylinders. Exhaust generated by the combustion process is exhausted to an aftertreatment system (not shown) through an exhaust manifold 22.

The torque converter 16 includes a fluid coupling that enables the engine to spin independently of the transmission 14. Although not illustrated, the torque converter 16 includes a pump, a turbine and a stator. The pump is a centrifugal pump that is driven by the engine 12. Fluid pumped by the pump drives the turbine, which in turn drives the transmission 14. The stator redirects fluid returning from the turbine before it hits the pump again to increase the efficiency of the torque converter 16. In a torque converter stall condition, the pump is turning and the turbine is not turning.

A control module 24 regulates operation of the vehicle system 10. More specifically, the control module 24 operates the engine 12 and the transmission 14 based on signals from operator input devices including, but not limited to, a range selector 26 and a brake pedal 28. The range selector 26 enables the operator to put the transmission 14 into one of a plurality of ranges including, but not limited to, a drive range (D), a reverse range (R), a neutral range (N) and a park range (P).

The control module 24 also regulates transmission operation based on signals from various sensors including, but not limited to, an engine RPM sensor 30, a transmission pressure sensor 32, a turbine speed sensor 34, and a transmission torque sensor 36. The control module 24 may regulate transmission operation using a stepped command signal and update an adaptive shift control system based on signals received from the sensors.

A remote module 38 is selectively linked for communication with the control module 24 through an interface 39. The remote module 38 provides an operator input for initiating and regulating the adaptive shift learn control of the present disclosure. More specifically, the remote module 38 initiates the adaptive shift learn control when the enable conditions are present. The remote module 38 further provides prompts to the operator as the adaptive shift learn control is executed.

Figure 2:
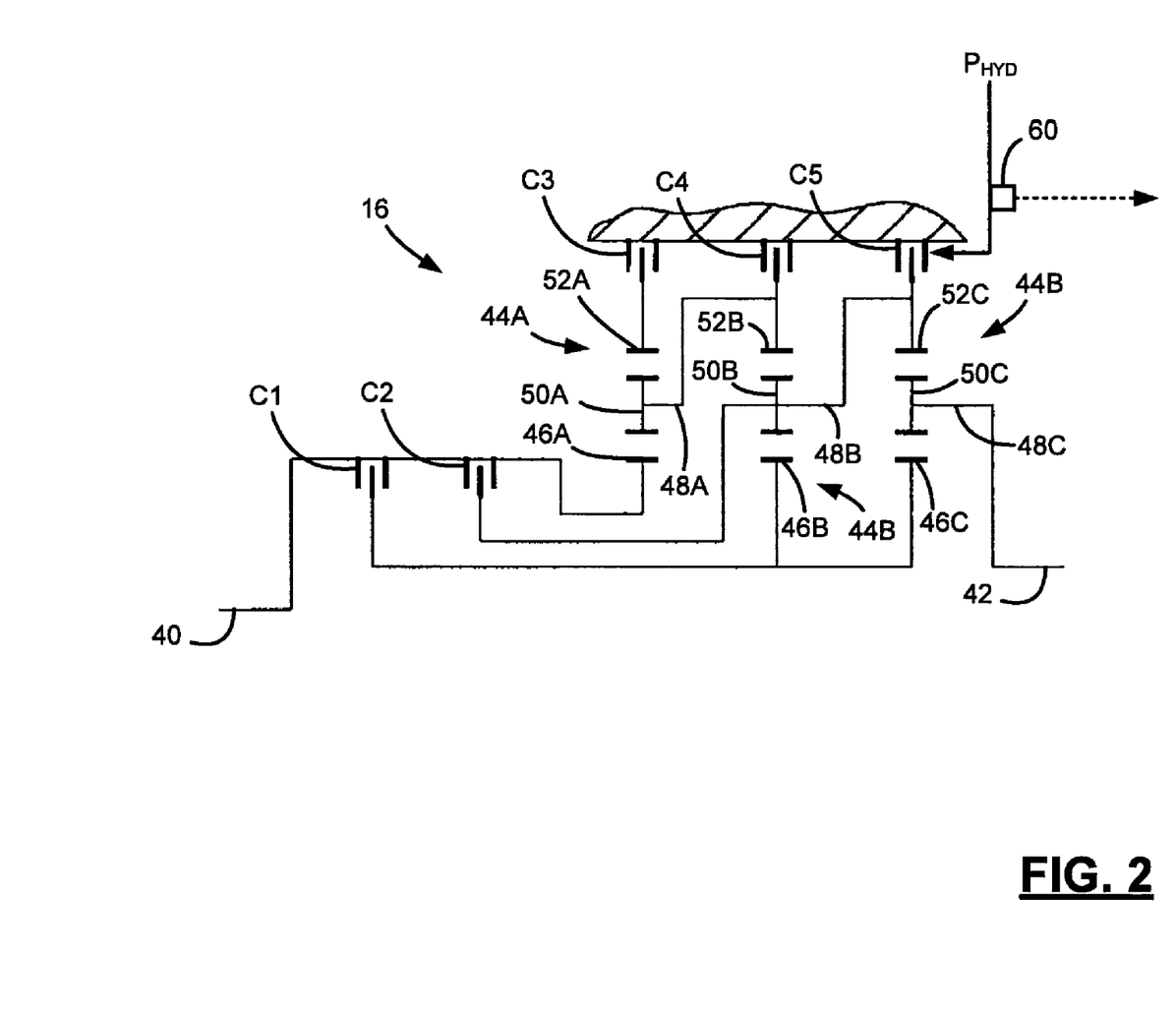
FIG. 2 is a schematic diagram of an exemplary transmission according to an embodiment of the present disclosure.

Referring now to FIG. 2, an embodiment of the transmission 14 is illustrated. The embodiment of the transmission 14 is a six-speed automatic transmission that is disclosed in commonly assigned U.S. Pat. No. 6,308,125, issued on Oct. 23, 2001 and entitled "Adaptive Clutch Control of a Closed-Throttle Downshift," the disclosure of which is expressly incorporated herein by reference. It is appreciated that the specific transmission described herein is merely exemplary in nature and that the adaptive shift learn control system of the present disclosure can be implemented with various other transmissions.

The transmission 14 includes an input shaft 40, an output shaft 42 and three inter-connected planetary gear sets 44A, 44B and 44C, respectively. The planetary gear sets 44A, 44B, 44C include respective sun gears 46A, 46B, 46C, carriers 48A, 48B, 48C, planetary gears 50A, 50B, 50C and ring gears 52A, 52B, 52C. The transmission 14 further includes clutches C1-C5 that are selectively engaged to establish a desired gear ratio of the transmission 14.

More specifically, the input shaft 40 continuously drives the sun gear 46A of the gear set 44A, selectively drives the sun gears 46B, 46C of the gear sets 44B, 44C via the clutch C1 and selectively drives the carrier 48B of the gear set 44B via the clutch C2. The ring gears 52A, 52B, 52C of the gear sets 44A, 44B, 44C are selectively grounded via the clutches C3, C4 and C5, respectively. Hydraulic pressure ($P_{HYD}$) is selectively provided to the various clutches to regulate engagement of the clutches.

A pressure switch 60 is associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) are controlled to provide six forward speed ratios (1, 2, 3, 4, 5, 6), a reverse speed ratio (R) or a neutral condition (N).

TABLE 1

|  | C1 | C2 | C3 | C4 | C5 |
|---|---|---|---|---|---|
| $1^{st}$ | X |  |  |  | X |
| $2^{nd}$ | X |  |  | X |  |
| $3^{rd}$ | X |  | X |  |  |
| $4^{th}$ | X | X |  |  |  |
| $5^{th}$ |  | X | X |  |  |
| $6^{th}$ |  | X |  | X |  |
| R |  |  | X |  | X |
| N |  |  |  |  | X |

For example, the second forward speed ratio is established when clutches C1 and C4 are engaged. Shifting from one speed forward speed ratio to another is generally achieved by disengaging one clutch (i.e., the off-going clutch) while engaging another clutch (i.e., the on-coming clutch). For example, the transmission is downshifted from second to first by disengaging clutch C4 while engaging clutch C5.

The adaptive shift learn control of the present disclosure is used after initial assembly of the vehicle system 10 and/or after service has been performed on the transmission 14. The adaptive shift learn control exercises the clutches C1-C5 using a stepped pressure command, calculates characteristics of each clutch based on measured parameters, and updates an adaptive shift system based on the characteristics. The clutch-to-clutch architecture of the transmission 14 is used to independently control and monitor the clutches C1-C5. More specifically, up to two secondary clutches may be applied to transfer torque to the output shaft 42 or tie-down the output shaft 42 to enable the turbine to tie-up when a primary clutch or test clutch is applied.

The adaptive shift learn control determines the characteristics of the test clutch when a plurality of operating conditions are present. These operating conditions may include: a transmission temperature within a normal operating range; the transmission output speed at zero RPM; the engine RPM within a desired range (e.g., at or near 1500 RPM); and the transmission pressure within a desired range (e.g., at or near 900 kPa).

The adaptive shift learn control monitors a plurality of parameters to determine the characteristics of the test clutch. These parameters may include a commanded clutch pressure, which is dependent on the test cycle and the clutch, and pressure switch states (e.g., ON/OFF).

Further, internal control checks are implemented to monitor DTCs, operator responses, and vehicle movement. Any vehicle movement or conditions that could induce vehicle movement during execution of the adaptive shift learn control stops the control routine until the conditions are corrected. If corrections are not made within a predetermined period, the adaptive shift learn control aborts. A failsafe feature may require vehicle shutdown before any normal transmission operation may resume when the adaptive shift learn control aborts and all of the clutches are locked into no pressure states.

Figure 3:
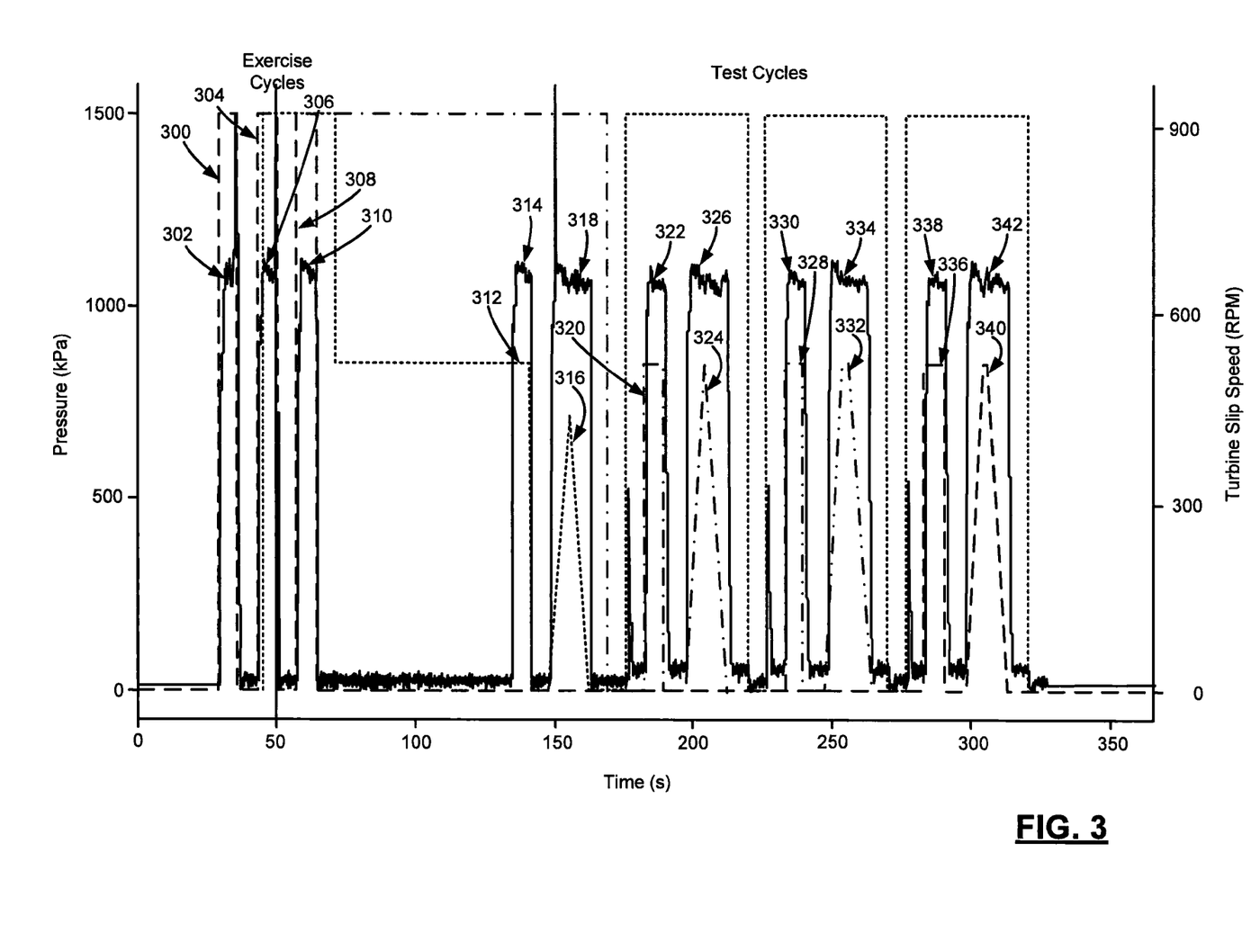
FIG. 3 illustrates exemplary cycles executed by an adaptive shift learn control system according to an embodiment of the present disclosure.

Referring now to FIG. 3, the adaptive shift learn control includes multiple clutch exercise cycles and multiple test cycles for collecting data and learning clutch characteristics. The dashed lines represent a clutch pressure and the solid line represents a turbine slip speed. Although the clutch pressure is shown as cycling in a block manner and a ramped manner, the clutch pressure may be cycled in a stepped manner, a sinusoidal manner, or other manners.

All of the clutches are exercised before testing. At 300, 304, and 308, the clutch pressure is cycled in a block manner to exercise a test clutch. At 302, 306, and 310, the turbine slip speed responds to the clutch pressure. Exercising purges air from the clutches, de-fuzzes the clutch surfaces, warms up the clutches and moves lubricants into parts that have not moved since vehicle assembly and/or service has been completed. The exercise cycles pressurize the clutches until the turbine speed drops to zero. The clutches are then exhausted. This is repeated as needed and is regulated via calibrations.

An on-coming pressure offset, an off-going pressure offset, and a pressure hysteresis may be determined during execution of the adaptive shift learn control. The on-coming and off-going pressure offsets and the pressure hysteresis may be used to develop a torque transfer function for a particular clutch as the clutch is engaged and disengaged (i.e., cycled between ON and OFF states). The transfer function may be developed for multiple clutches at various transmission output torques and stored in a reference table. A clutch fill time may also be determined, as described in application Ser. No. 11/175,115.

All of the clutches may be tested. At 312, 320, 328, and 336, the clutch pressure is cycled in a block manner to determine the clutch fill time. At 314, 322, 330, and 338, the turbine slip speed responds to the clutch pressure that is cycled in a block manner. At 316, 324, 332, and 340, the clutch pressure is cycled in a ramped manner to determine the on-coming and off-going pressure offsets. At 318, 326, 334, and 342, the turbine slip speed responds to the clutch pressure that is cycled in a ramped manner.

Figure 4:
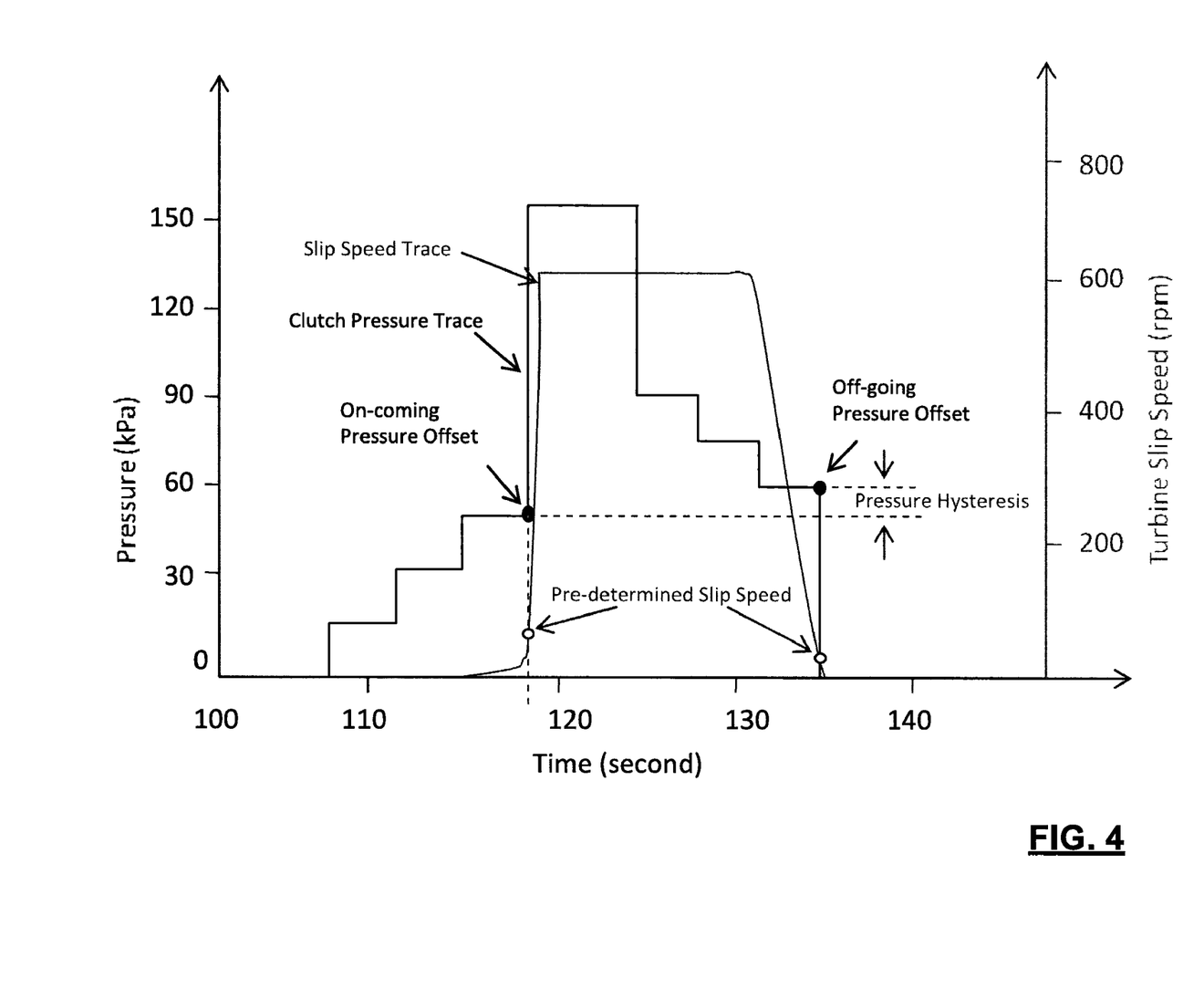
FIG. 4 illustrates a detailed view of an exemplary cycle of FIG. 3 for determining an on-coming offset, an off-going offset, and a pressure hysteresis according to an embodiment of the present disclosure.

Referring now to FIG. 4, a clutch command pressure and a torque converter slip speed are shown. The clutch command pressure is increased and decreased in a stepped manner such that the clutch command pressure remains at a predetermined pressure for a predetermined period. For example only, the clutch command pressure remains at approximately 15 kPa for approximately 4 seconds before the clutch command pressure is increased.

An on-coming pressure offset, an off-going pressure offset, and a pressure hysteresis are determined based on the clutch command pressure and the torque converter slip speed. The on-coming pressure offset is equal to the clutch command pressure at a predetermined on-coming slip speed. The off-going pressure offset is equal to the clutch command pressure at a predetermined off-going slip speed. The pressure hysteresis is equal to a difference between the on-coming and off-going pressure offsets. The pressure hysteresis accompanying directional changes between applies and releases may be due to material friction, variable spring forces, and command pressure errors.

The on-coming and off-going slip speeds may be predetermined based on a measured clutch pressure, the commanded clutch pressure, and the torque converter slip speed using calibration methods. For example, the measured clutch pressure may increase above the commanded clutch pressure when clutch engagement occurs, and the corresponding torque converter slip speed may be the on-coming slip speed. In another example, the measured clutch pressure may decrease below the commanded clutch pressure when clutch disengagement occurs, and the corresponding torque converter slip speed may be the off-going slip speed. The transmission pressure sensor 32 may be included in the vehicle system 10 to detect the measured clutch pressure during calibration and eliminated from the vehicle system 10 during normal operation.

The predetermined on-coming and off-going slip speeds may vary based on a transmission output torque. More specifically, the on-coming and off-going slip speeds may be determined at multiple transmission output torque levels based on the measured clutch pressure using calibration methods. A relationship between the predetermined slip speeds and the transmission torque may be developed using several data points. The relationship between the predetermined slip speeds and the transmission torque may be stored in a reference table.

Figure 5:
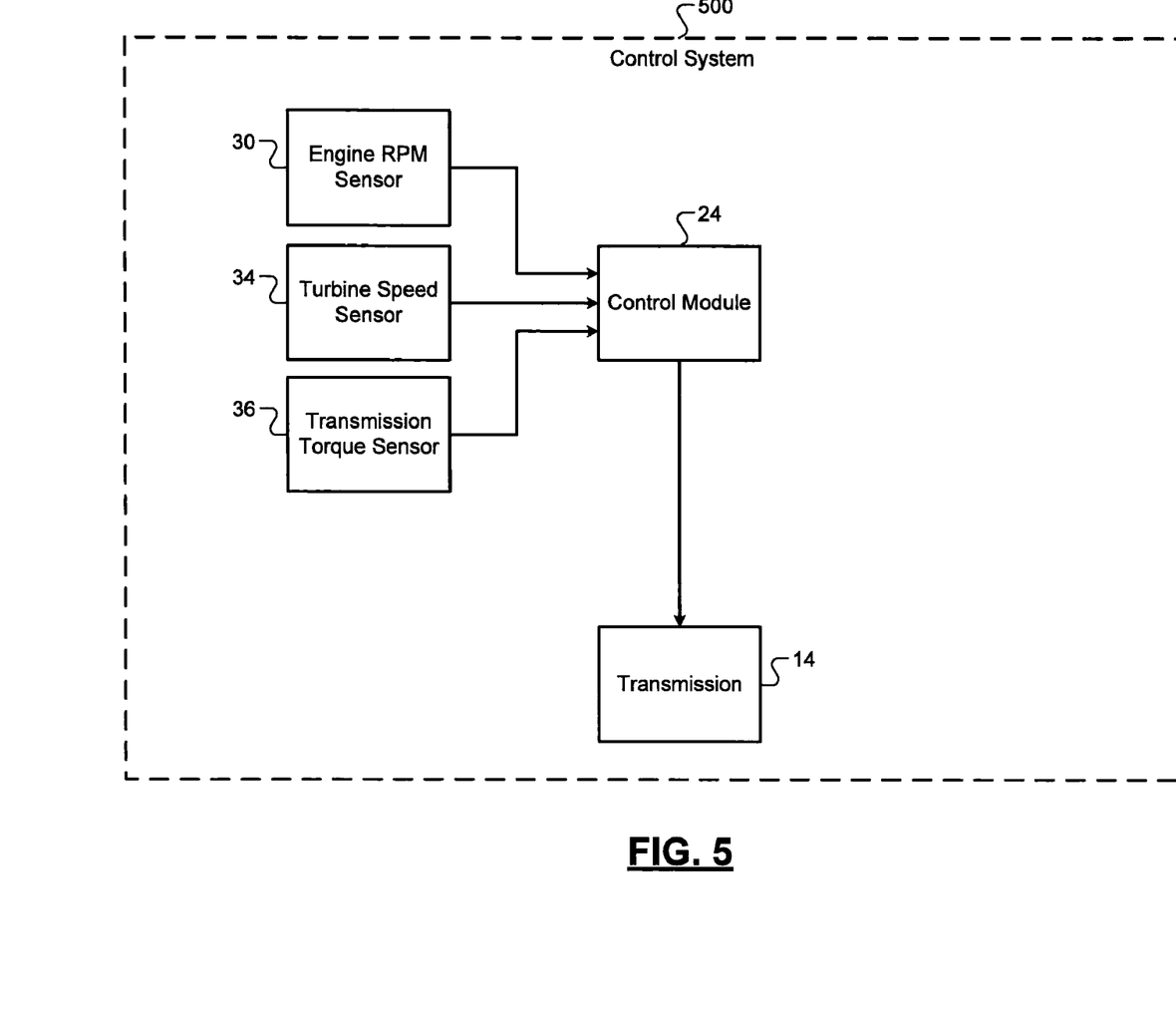
FIG. 5 is a functional block diagram of an adaptive shift learn control system according to an embodiment of the present disclosure.

Referring now to FIG. 5, a control system 500 includes the transmission 14, the control module 24, the engine RPM sensor 30, the turbine speed sensor 34, and the transmission torque sensor 36. The control module 24 cycles a primary clutch of the transmission 14 using a stepped pressure command while a secondary clutch of the transmission 14 is fully engaged (i.e., in a full ON state). The control module 24 receives an engine RPM from the engine RPM sensor 30, a turbine speed from the turbine speed sensor 34, and a transmission output torque from the transmission torque sensor 36.

The control module 24 determines the torque converter slip speed based on the engine RPM and the turbine speed. More specifically, the control module 24 may set the torque converter slip speed equal to a difference between the engine RPM and the turbine speed. The control module 24 calculates an on-coming pressure offset, an off-going pressure offset, and a pressure hysteresis based on the stepped pressure command, the torque converter slip speed and the transmission output torque.

The control module 24 updates an adaptive shift control system based on the on-coming pressure offset, the off-going pressure offset, and the pressure hysteresis. The adaptive shift control system may be the control system 500, in which case updating the adaptive shift control system may include updating reference tables stored with the control module 24. Alternatively, the adaptive shift control system may be separate from the control system 500.

Figure 6:
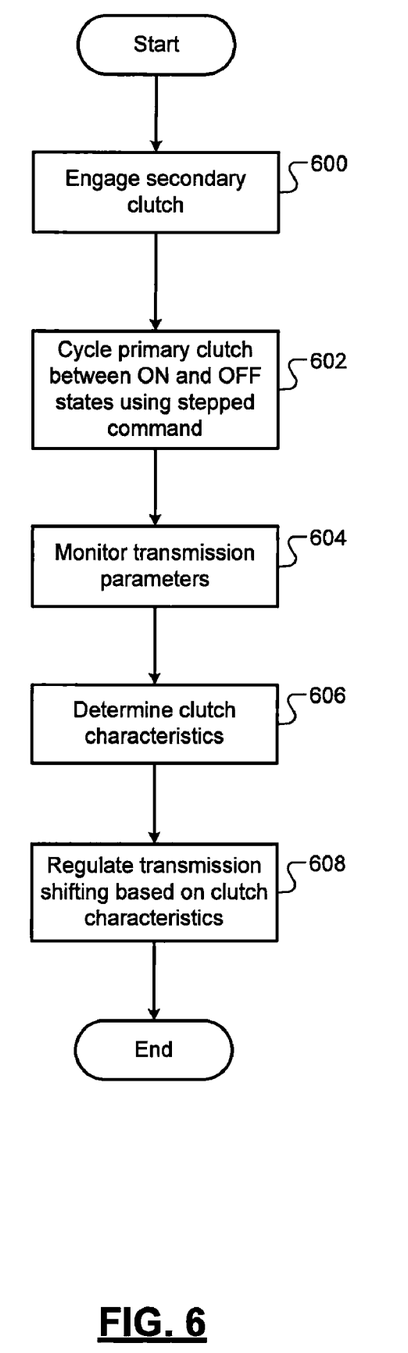
FIG. 6 illustrates an adaptive shift learn control method according to an embodiment of the present disclosure.

Referring now to FIG. 6, exemplary steps of an adaptive shift learn control method of the present disclosure are illustrated. In step 600, control engages a secondary clutch or secondary clutches to provide a tie-up condition of the transmission 14.

In step 602, control cycles a primary clutch in a between ON and OFF states using a stepped command signal. The stepped command signal may be a stepped pressure command. Alternatively, the stepped command signal may be a position command or other commands that cause the primary clutch to cycle between the ON and OFF states.

In step 604, control monitors parameters of the transmission 14. The parameters may include a torque converter slip speed and/or a transmission output torque. In step 606, control determines characteristics of the primary clutch based on the parameters. The characteristics may include an on-coming pressure offset, an off-going pressure offset, and/or a pressure hysteresis.

When the command signal is a stepped pressure command, the characteristics may be determined as describe in reference to FIG. 4. When the command signal is another command, such as a stepped position command, the characteristics may be determined in a similar manner. For example, on-coming and off-going position offsets may be equal to a clutch command position at the predetermined on-coming and off-going slip speeds, respectively.

In another example, the predetermined on-coming and off-going slip speeds may be determined based on a measured clutch position using calibration methods and a clutch position sensor (not shown). The on-coming slip speed may be the torque converter slip speed when the measured clutch position initially corresponds to an engaged position. The off-going slip speed may be the torque converter slip speed when the measured clutch position initially corresponds to a disengaged position.

In step 608, control updates an adaptive shift control system based on the calculated characteristics to regulate transmission shifting. Control may repeat steps 600 through 606 such that the characteristics are calculated for each clutch in the transmission. Control may update an adaptive shift control system based on the calculated characteristics for each clutch.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
   first and second clutches of a transmission, wherein each of said first and second clutches includes an on state and an off state; and
   a control module that cycles said first clutch between said on state and said off state using a stepped command signal while said second clutch is maintained in said on state, that monitors an output parameter of said transmission that is based on said stepped command signal, and that controls said transmission based on said output parameter, wherein said stepped command signal adjusts a clutch pressure in N steps for a single clutch engagement event and N is an integer that is greater than two.

2. The control system of claim 1 wherein said control module maintains said clutch pressure at a predetermined pressure value for a predetermined period while cycling said first clutch.

3. The control system of claim 2 wherein said output parameter includes at least one of a torque converter slip speed and a transmission output torque.

4. The control system of claim 3 wherein said control module calculates at least one of an on-coming pressure offset, an off-going pressure offset, and a pressure hysteresis based on said output parameter.

5. The control system of claim 4 wherein said on-coming pressure offset is equal to said clutch pressure when said torque converter slip speed is equal to a predetermined on-coming slip speed.

6. The control system of claim 5 wherein said predetermined on-coming slip speed varies based on said transmission output torque.

7. The control system of claim 4 wherein said off-going pressure offset is equal to said clutch pressure when said torque converter slip speed is equal to a predetermined off-going slip speed.

8. The control system of claim 7 wherein said predetermined off-going slip speed varies based on said transmission output torque.

9. The control system of claim 4 wherein said pressure hysteresis is equal to a difference between said off-going pressure offset and said on-coming pressure offset.

10. A method, comprising:
    providing first and second clutches of a transmission, wherein each of said first and second clutches includes an on state and an off state;
    cycling said first clutch between said on state and said off state using a stepped command signal while maintaining said second clutch in said on state, wherein said stepped command signal adjusts a clutch pressure in N steps for a single clutch engagement event and N is an integer that is greater than two;
    monitoring an output parameter of said transmission that is based on said stepped command signal; and
    controlling said transmission based on said output parameter.

11. The method of claim 10 further comprising maintaining said clutch pressure at a predetermined pressure value for a predetermined period while cycling said first clutch.

12. The method of claim 11 wherein said output parameter includes at least one of a torque converter slip speed and a transmission output torque.

13. The method of claim 12 further comprising calculating at least one of an on-coming pressure offset, an off-going pressure offset, and a pressure hysteresis based on said output parameter.

14. The method of claim 13 wherein said on-coming pressure offset is equal to said clutch pressure when said torque converter slip speed is equal to a predetermined on-coming slip speed.

15. The method of claim 14 wherein said predetermined on-coming slip speed varies based on said transmission output torque.

16. The method of claim 13 wherein said off-going pressure offset is equal to said clutch pressure when said torque converter slip speed is equal to a predetermined off-going slip speed.

17. The method of claim 16 wherein said predetermined off-going slip speed varies based on said transmission output torque.

18. The method of claim 13 wherein said pressure hysteresis is equal to a difference between said off-going pressure offset and said on-coming pressure offset.

* * * * *